United States Patent
Ito et al.

(10) Patent No.: US 8,077,916 B2
(45) Date of Patent: Dec. 13, 2011

(54) IMAGE PROCESSING SYSTEM THAT DETECTS AN OBJECT BY COMPARISON OF A DIFFERENCE BETWEEN LUMINANCE OF AN ILLUMINATED AND NON-ILLUMINATED IMAGE

(75) Inventors: Hisao Ito, Oita (JP); Kozo Baba, Oita (JP); Akiyoshi Tafuku, Oita (JP); Masatoshi Tohno, Kawasaki (JP); Tadao Omi, Kawasaki (JP); Taku Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1149 days.

(21) Appl. No.: 11/892,140

(22) Filed: Aug. 20, 2007

(65) Prior Publication Data

US 2007/0291989 A1 Dec. 20, 2007

Related U.S. Application Data

(63) Continuation of application No. PCT/JP2005/002633, filed on Feb. 18, 2005.

(51) Int. Cl.
*G06K 9/00* (2006.01)
(52) U.S. Cl. .......................... 382/103; 382/104
(58) Field of Classification Search .......... None
See application file for complete search history.

(56) References Cited

FOREIGN PATENT DOCUMENTS

| JP | 2000-163564 | | 6/2000 |
|---|---|---|---|
| JP | 2000-172961 | | 6/2000 |
| JP | 2002-83287 | | 3/2002 |
| JP | 2002-298232 | | 10/2002 |
| JP | 2002298232 A | * | 10/2002 |
| JP | 2003-296721 | | 10/2003 |
| JP | 2003296721 A | * | 10/2003 |
| JP | 2004-234367 | | 8/2004 |
| JP | 2004-234494 | | 8/2004 |

OTHER PUBLICATIONS

International Search Report of International Published Application No. PCT/JP2005/002633 (mailed Apr. 26, 2005).

* cited by examiner

*Primary Examiner* — Samir Ahmed
*Assistant Examiner* — Fred Hu
(74) *Attorney, Agent, or Firm* — Fujitsu Patent Center

(57) ABSTRACT

Using an on-vehicle camera mounted on a vehicle to view the face of a driver as an imaging object, an image processing system judges the presence/absence of the imaging object in the image. An average luminance of an image when light of a particular wavelength is irradiated in an imaging direction is compared to an average luminance of an image imaged when no light is irradiated. When the difference between the average luminance values is equal to a reference value or less, it is judged that the imaging object is absent in the image by imaging.

18 Claims, 4 Drawing Sheets

IMAGE PROCESSING SYSTEM THAT DETECTS AN OBJECT BY COMPARISON OF A DIFFERENCE BETWEEN LUMINANCE OF AN ILLUMINATED AND NON-ILLUMINATED IMAGE

CROSS REFERENCE TO RELATED APPLICATIONS

This application is a continuation of PCT International Application No. PCT/JP05/002633 which has an International filing date of Feb. 18, 2005 and designated the United States of America and which is incorporated herein by reference.

BACKGROUND

The present invention relates to an image processing method for detecting a particular imaging object from an image obtained by imaging, an image processing system to which the image processing method is applied, an image processing device used in the image processing system, and a computer program product for realizing the image processing device, and particularly relates to the image processing method, the image processing system, the image processing device, and the computer program product for judging presence/absence of the imaging object.

As a device for supporting driving of a vehicle such as an automobile, there is proposed an image processing device for imaging a face of a driver by using an on-vehicle camera mounted on a vehicle disposed at a position capable of imaging the face of the driver and performing image processing for detecting a contour of the face, positions of eyes and a nostril of the driver from the obtained image (for example, see Japanese Patent Application Laid Open No. 2004-234367). By using such a device, it is possible to constitute a system capable of detecting a condition of the driver and performing driving support such as a warning of inattentive driving.

However, a conventional image processing device executes a processing of detecting an imaging object on the assumption that the imaging object is present in an area of the image obtained by imaging, and therefore, when the imaging object is absent in the area of the image obtained by imaging, the processing for detecting the imaging object from a background image where the image is absent is executed. For this reason, there is a problem that abnormality occurs with high possibility, such as the increase of a processing load caused by unnecessarily repeating error recognition and detection processing from the background image.

SUMMARY

In view of the above-described circumstances, an object of the present invention is to provide an image processing method capable of reducing the possibility of abnormality generated at the image processing by irradiating light in an imaging direction, comparing the image (irradiated image) imaged when light is irradiate and the image (non-irradiated image) imaged when no light is irradiated, and thereby judging the presence/absence of the imaging object in the image, an image processing system to which the image processing method is applied, an image processing device used in the image processing system, and a computer program product for realizing the image processing device.

An image processing method according to a first aspect is an image processing method for detecting a particular imaging object from an image imaged by an image processing device having imaging means and irradiating means. The method according to the first aspect is characterized by comprising: irradiating light by the irradiating means in an imaging direction of said imaging means; by the image processing device, comparing an irradiated image imaged when light is irradiated by the irradiating means and a non-irradiated image imaged when no light is irradiated by the irradiating means; and by the image processing device, judging presence/absence of the imaging object in the image imaged by the imaging means based on a result of the comparing of the irradiated image and the non-irradiated image.

An image processing system according to a first aspect is an image processing system including imaging means, irradiating means for irradiating light in a direction in which the imaging means images, and an image processing device for detecting a particular imaging object from an image imaged by the imaging means. The image processing system according to the first aspect is characterized in that the image processing device comprises: comparing means for comparing an irradiated image imaged when light is irradiated by the irradiating means and a non-irradiated image imaged when no light is irradiated by the irradiating means; and judging means for judging presence/absence of the imaging object in the image imaged by the imaging means based on a result of the comparison of the irradiated image and the non-irradiated image by the comparing means.

An image processing device according to a first aspect is an image processing device for detecting a particular imaging object from an image imaged by imaging means. The image processing device according to the first aspect is characterized by comprising: irradiating means for irradiating light in an imaging direction of the imaging means; comparing means for comparing an irradiated image imaged when light is irradiated by the irradiating means and a non-irradiated image imaged when no light is irradiated by the irradiated means; and judging means for judging presence/absence of the imaging object in the image imaged by the imaging means based on a result of the comparison of the irradiated image and the non-irradiated image.

According to such image processing method, image processing system, and image processing device of the first aspect, when the imaging object is present, difference is generated among the images depending on a light irradiation condition, thus making it possible to judge the presence/absence of the imaging object. Accordingly, in spite of no imaging object in the image, the processing for detecting the imaging object from the background image where the imaging object is absent is executed, but it is possible to prevent the generation of the abnormality such as increase of the processing load caused by unnecessarily repeating the error recognition and detection processing from the background image.

An image processing method according to a second aspect is, in the image processing method according to the first aspect, characterized by further comprising acquiring a luminance of the image imaged by the imaging means, wherein the comparing is a comparing of the luminance of the irradiated image and the luminance of the non-irradiated image, and the judging is a judging that the imaging object is absent when the difference of the luminance of the irradiated image and the luminance of the non-irradiated image is less than a reference value.

An image processing system according to a second aspect is, in the image processing system according to the first aspect, characterized in that the image processing device further comprises means for acquiring a luminance of the image imaged by the imaging means, the comparing means compares the luminance of the irradiated image and the luminance of the non-irradiated image both imaged by the imaging means, and the judging means judges that the imaging object is absent when the difference of the luminance of the irradiated image and the luminance of the non-irradiated image is less than a reference value.

An image processing device according to a second aspect is, in the image processing device according to the first aspect, characterized by further comprising means for acquiring a luminance of the image imaged by the imaging means, wherein the comparing means compares the luminance of the irradiated image and the luminance of the non-irradiated image imaged by the imaging means, and the judging means judges that the imaging object is absent when the difference of the luminance of the irradiated image and the luminance of the non-irradiated image is less than a reference value.

According to such image processing method, image processing system, and image processing device of the second aspect, when the imaging object is present, luminance of the image is largely changed depending on the light irradiation condition. Therefore, since the presence/absence of the imaging object can be judged, it is possible to prevent the generation of the abnormality when the imaging object is absent in the image.

An image processing method according to a third aspect is, in the image processing method according to the second aspect, characterized in that the luminance is an average luminance of pixels constituting the image imaged by the imaging means.

An image processing system according to a third aspect is, in the image processing system according to the second aspect, characterized in that the luminance is an average luminance of pixels constituting the image imaged by the imaging means.

An image processing device according to a third aspect is, in the image processing device according to the second aspect, characterized in that the luminance is an average luminance of pixels constituting the image imaged by the imaging means.

According to such image processing method, image processing system, and image processing device of the third aspect, the presence/absence of the imaging object is judged based on a comparison of an average luminance, thereby making it possible to improve judgment accuracy.

An image processing method according to a fourth aspect is, in the image processing method according to the third aspect, characterized in that the judging is a judging that the presence/absence of the imaging object in the image imaged by the imaging means based on an absolute luminance derived from an average luminance of pixels constituting the image imaged by the imaging means, an irradiation condition of the irradiating means, and an imaging condition of the imaging means.

An image processing system according to a fourth aspect is, in the image processing system according to the third aspect, characterized in that the image processing device further comprises means for judging the presence/absence of the imaging object in the image imaged by the imaging means based on an absolute luminance derived from an average luminance of pixels constituting the image imaged by the imaging means, an irradiation condition of the irradiating means, and an imaging condition of the imaging, means.

An image processing device according to a fourth aspect is, in the image processing device according to the third aspect, characterized by further comprising means for judging the presence/absence of the imaging object in the image imaged by the imaging means based on an absolute luminance derived from an average luminance of pixels constituting the image imaged by the imaging means, an irradiation condition of the irradiating means, and an imaging condition of the imaging means.

According to such image processing method, image processing system, and image processing device of the fourth aspect, by judging the presence/absence of the imaging object based on an absolute luminance, the influence of external light such as solar light can be suppressed, thereby making it possible to improve the judgment accuracy.

An image processing method according to a fifth aspect is, in the image processing method according to the fourth aspect, characterized by further comprising judging possibility of detection of the particular imaging object from the image imaged by the imaging means, wherein the comparing and the judging are not executed when the particular imaging object is detected.

An image processing system according to a fifth aspect is, in the image processing system according to the fourth aspect, characterized in that the image processing device further comprises means for judging possibility of detection of the particular imaging object from the image imaged by the imaging means, and the comparing means and the judging means do not execute the processing thereof when the particular imaging object is detected.

An image processing device according to a fifth aspect is, in the image processing device according to the fourth aspect, characterized by further comprising means for judging possibility of detection of the particular imaging object from the image imaged by the imaging means, wherein the comparing means and the judging means do not execute processing thereof when the particular imaging object is detected.

According to such image processing method, image processing system, and image processing device of the fifth aspect, by avoiding an unnecessary comparison and judgment processing, the processing load can be reduced.

In addition, in the image processing method, image processing system, and image processing device of each aspect, when a visible light beam but using an infrared ray, distance between imaging means and the imaging object is mainly reflected on the luminance of the image, and the influence of the luminance due to a contrast of the background image such as a pattern of a seat can be suppressed, thereby making it possible to improve the judgment accuracy.

According to computer program products of first through fifth aspects, by executing the computer program in the computer, the computer is operated as the image processing device, and when the imaging object is present, the difference is generated among the images depending on the irradiation condition of the light. Therefore, the presence/absence of the imaging object can be judged. Accordingly, in spite of no imaging object in the image, the processing for detecting the imaging object from the background image where the imaging object is absent is executed, but it is possible to prevent the generation of the abnormality such as the increase of the processing load caused by unnecessarily repeating the error recognition and detection processing from the background image.

The image processing method, image processing system, image processing device, and computer program product according to each aspect are applied to a system using an on-vehicle camera mounted on a vehicle for imaging a face of a driver, wherein an average luminance of an irradiated image imaged when light is irradiated and an average luminance of a non-irradiated image imaged when no light is irradiated are compared and when a difference between them is less than a reference value, it is judged that the imaging object is absent in the image by imaging.

With this structure, when the imaging object is present, the difference is generated in the luminance of the images depending on a light irradiation condition, thus making it possible to judge the presence/absence of the imaging object. Accordingly, there is an excellent effect that, in spite of no imaging object in the image, the processing for detecting the imaging object from the background image where the imaging object is absent is executed, but it is possible to prevent the generation of the abnormality such as the increase of the processing load by unnecessarily repeating the error recognition and detection processing from the background image. Then, reduction of the processing load on the entire system and stabilization of the processing are realized. Therefore, there is an excellent effect that, when the system is applied to a system for detecting a condition of a driver and performing a driving support such as warning of the inattentive driving, it is possible to constitute a reliable driving support system with little error operation by high-speed and stable pressing even under an emergent situation.

In addition, in the image processing method, image processing system, image processing device, and computer program product according to each aspect, the presence/absence of the imaging object is judged based on an absolute luminance, and the influence of the light by camera control can be suppressed. Therefore, an excellent effect such that the judgment accuracy improves is provided.

Further, in the image processing method, image processing system, image processing device, and computer program product according to each aspect, by irradiating the light in the imaging direction, the distance between the imaging means and the imaging object is mainly reflected on the luminance of the image and the influence of the luminance due to the contrast of the background image such as a pattern of a seat can be suppressed. Therefore, an excellent effect such that the judgment accuracy can be improved is provided.

BRIEF DESCRIPTION OF THE DRAWINGS

The above and further objects and features of the invention will more fully be apparent from the following detailed description with accompanying drawings.

DETAILED DESCRIPTION OF THE PREFERRED EMBODIMENT

Figure 1:
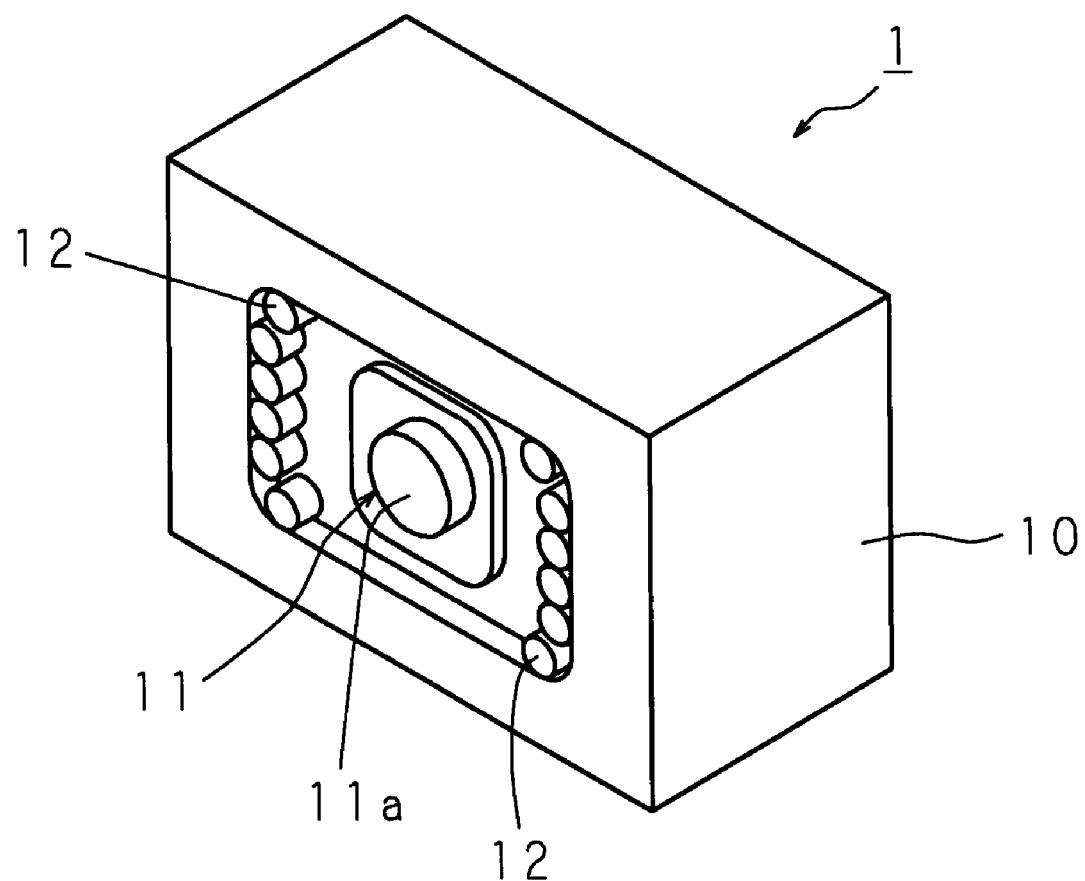
FIG. 1 is a perspective view showing an external appearance of an imaging device used in an image processing system of the present invention.

Reference will now be made in detail to the preferred embodiments, examples of which are illustrated in the accompanying drawings, wherein like reference numerals refer to like elements throughout.

The present invention will be described in detail hereunder based on the drawings showing embodiments thereof. FIG. 1 is a perspective view showing an external appearance of an imaging device used in an image processing system of the present invention. In FIG. 1, reference numeral 1 denotes an imaging device such as an on-vehicle camera mounted on a vehicle. In an imaging device 1 as shown in FIG. 1, an imaging unit 11 using an imaging element such as a CCD (Charge Coupled Device), etc., is arranged in a center of one surface of a housing 10 formed in a rectangular parallelepiped shape, and a plurality of irradiation units 12 each using a light emitting element such as an LED (Light Emitting Diode) are arranged around the imaging unit 11. The imaging unit 11 and the irradiation units 12 are arranged on the same surface of the housing 10 of the imaging device 1, so that an imaging direction and an irradiation direction correspond. The irradiation unit 12 is constituted, so as to emit light of a wavelength in a near-infrared region such as 870 nm, by using a semiconductor chip such as a GaAlAs. A filter 11a made of a methacrylic resin, etc., capable of selectively transmitting the light of the wavelength in the near-infrared region is incorporated in a light reception unit of the imaging unit 11. By using the near-infrared light, being invisible light as the light irradiated by the irradiation units 12, the driver who receives the irradiation of the light does not notice the irradiation, and driving is thus not disturbed. In addition, because the filter 11a selectively transmits the light of the wavelength in the near-infrared region and cuts a visible light, the imaging unit 11 can execute the processing without being influenced by the external light. Then, the imaging device 1 is arranged in front of the driver such as a steering wheel and a dashboard in the vehicle, in a state that the face of the driver can be imaged as the imaging object, and the imaging object is irradiated with the near-infrared light from the irradiation unit 12 and imaged by the imaging unit 11. Each condition including incorporation of the imaging unit 11 and the irradiation unit 12 into the same device is an only an example, and can be suitably set in accordance with a system structure and a purpose, etc. For example, a device having the imaging unit 11 and a device having the irradiation unit 12 are constituted as separate bodies and may be disposed at different positions respectively.

Figure 2:
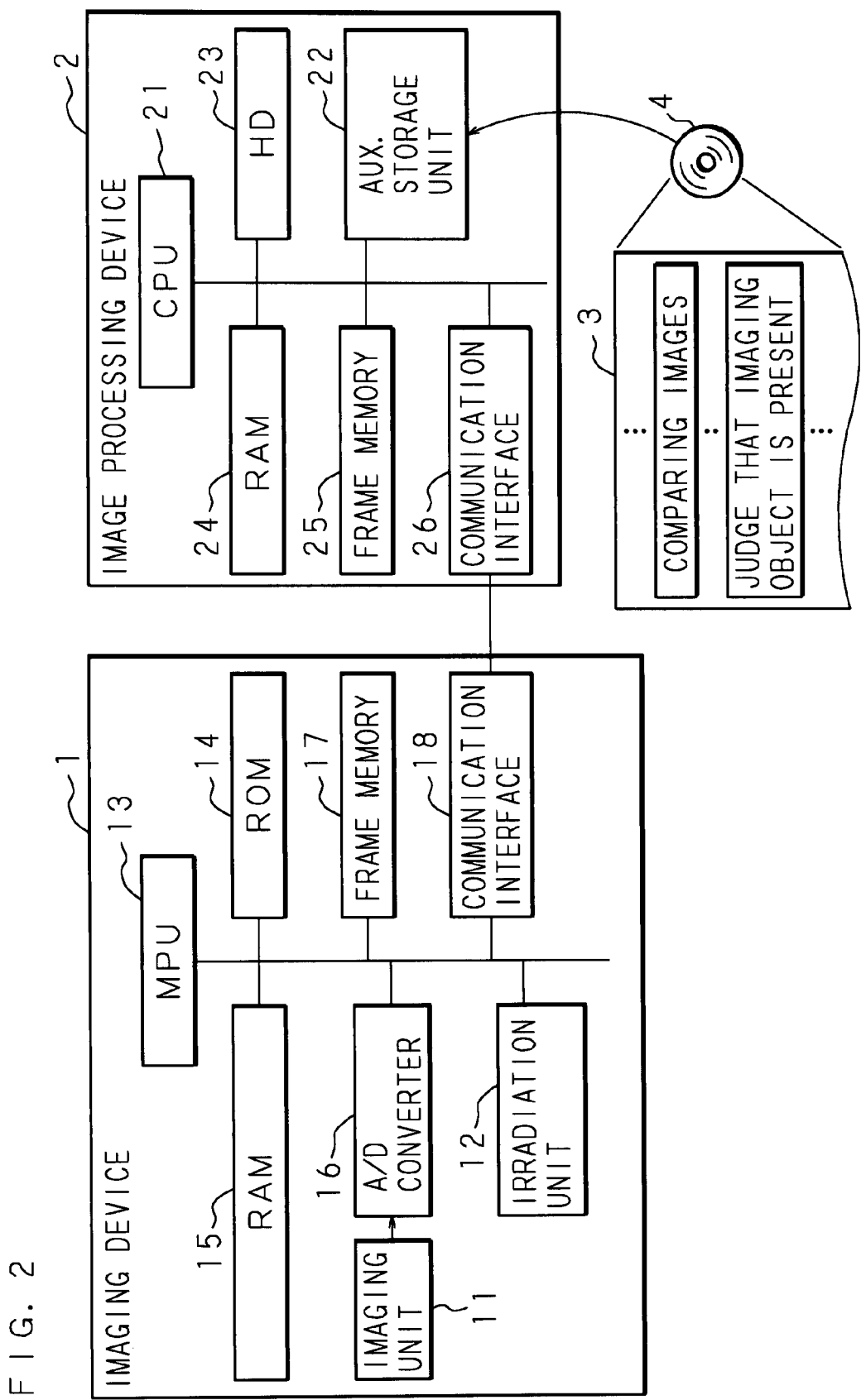
FIG. 2 is a block diagram showing a constitutional example of the image processing system of the present invention.

FIG. 2 is a block diagram showing a constitutional example of the image processing system of the present invention. The imaging device 1 is connected to an image processing device 2 using an on-vehicle computer performing the image processing such as detecting the imaging object from the image obtained by the imaging device 1, through a communication network of a communication line such as an exclusive cable or in-vehicle LAN (Local Area Network) constituted by wire or wireless. The imaging device 1 is provided with an MPU (Micro Processor Unit) 13 for controlling the whole of the device; a ROM (Read Only Memory) 14 for recording various computer programs executed based on the control of the MPU 13 and data; and a RAM (Random Access Memory) 15 for storing various data temporarily generated during executing the computer program recorded in the ROM 14. Further, the imaging device 1 is provided with the aforementioned imaging unit 11 and the irradiation unit 12, and is further provided with; an A/D converter 16 for converting analog image data acquired by imaging of the imaging unit 11 into digital data; a frame memory 17 for temporarily storing the image data converted into digital by the A/D converter 16; and a communication interface 18 used in the communication with the image processing device 2.

In the imaging device 1, the imaging object irradiated with near-infrared light by the irradiation units 12 is imaged by the imaging unit 11, and on the basis of the imaging, for example, 30 sheets of image data (image frames) are generated per one second, and is outputted to the A/D converter 16. In the A/D converter 16, the image data is converted into the digital image data expressed by gradation such as 256 gradations (1 Byte) constituting the image data. Then, the image data converted into the digital image data is stored in the frame memory 17, and the image data thus stored is outputted to an image processing device 2 at a predetermined timing. In addition, imaging condition data indicating an imaging condition such as a shutter speed and a gain of the imaging unit 11 during imaging and irradiation condition data indicating an irradiation condition such as an irradiation time of the irradiation unit 12 are outputted to the image processing device 2, together with the image data. Further, in the imaging device 1, various data regarding the control of various circuits, such as an imaging condition of the imaging unit 11 and the irradiation condition of the irradiation units 12, are accepted from the image processing device 2 at a predetermined timing, and each circuit such as the imaging unit 11 and the irradiation units 12 is controlled based on the data thus accepted.

The image processing device 2 is provided with a CPU (Central Processing Unit) 21 for controlling the whole of the device; an auxiliary storage unit 22 such as a CD-ROM drive for reading information from a recording medium 4 such as a CD-ROM recording various information such as a computer program 3 and data; a hard disk (called HD hereafter) 23 recording various information read by the auxiliary storage unit 22; a RAM 24 for storing various data temporarily generated during executing the computer program 3 recorded in the HD 23; a frame memory 25 constituted by a non-volatile memory; and a communication interface 26 used in the communication with the imaging device 1. Then, various information such as the computer program 3 and data are read from the HD23, which is then stored in the RAM 24, and various procedure included in the computer program 3 is executed by the CPU 21, thereby making it possible to operate the on-vehicle computer as the image processing device 2 of the present invention.

The image processing device 2 accepts the image data outputted from the imaging device 1 by the communication interface 26, records the image data thus accepted in the frame memory 25, reads the image data recorded in the frame memory 25, performs various image processing, and outputs various data for controlling the imaging device 1 to the imaging device 1 from the communication interface 26 based on a result of the image processing. The various image processing executed to the accepted image data are the various processing regarding the detection of a detection object such as detecting the contour of the face and locating positions of eyes and nose of the driver, being the detection object (imaging object during imaging) from the image data. Specifically, an example of the processing can point out a processing for summing the luminance arranged in a vertical direction of the image, comparing the summed value and a predetermined threshold value, thereby detecting an area in a horizontal direction of the contour of the face constituted by pixels with higher luminance than the luminance of the background. In addition, another example of the processing can point out a processing for differentiating the change in the horizontal direction of the summed value and specifying the position where the change is large, and detecting a boundary between the background and the contour of the face where the luminance is largely changed. Further another example of the processing is given such as detecting the position of the eyes by pattern matching. Detailed contents of processing are described in documents such as Japanese Patent Application Laid-Open No. 2000-163564, Japanese Patent Application Laid-Open No. 2004-234494, and Japanese Patent Application Laid-Open No. 2004-234367, filed by an applicant of the present invention. Note that such as an image processing is not necessarily limited to the processing described in Japanese Patent Application Laid-Open No. 2000-163564, Japanese Patent Application Laid Open No. 2004-234494, and Japanese Patent Application Laid Open No. 2004-234367, and can be suitably selected in accordance with a condition such as its purpose of use, a hardware structure, and cooperation with other application program.

Figure 3:
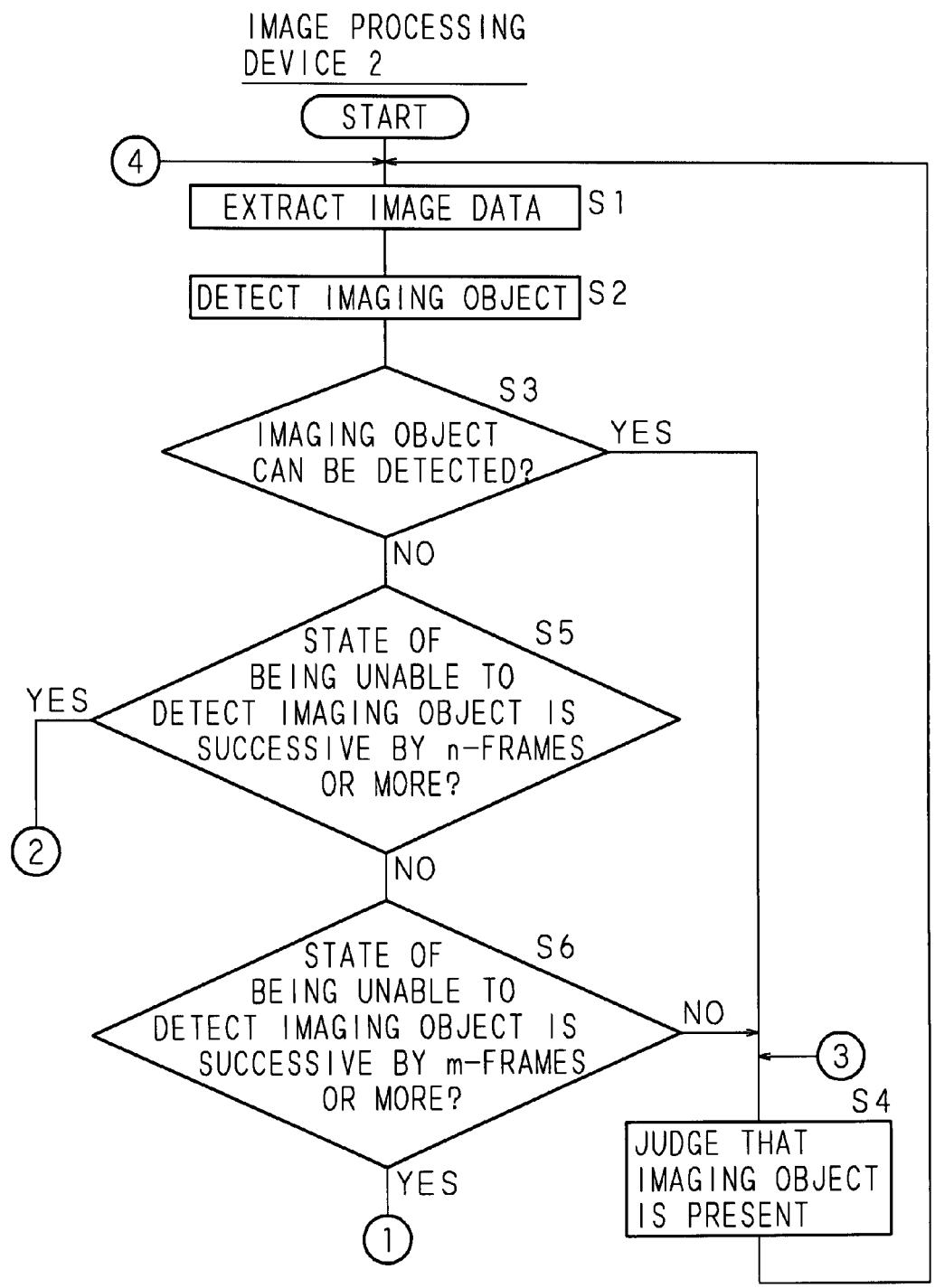
FIG. 3 is a flowchart showing a processing of an image processing device used in the image processing system of the present invention and FIG. 4 is a flowchart showing the processing of the image processing device used in the image processing system of the present invention.
Figure 4:
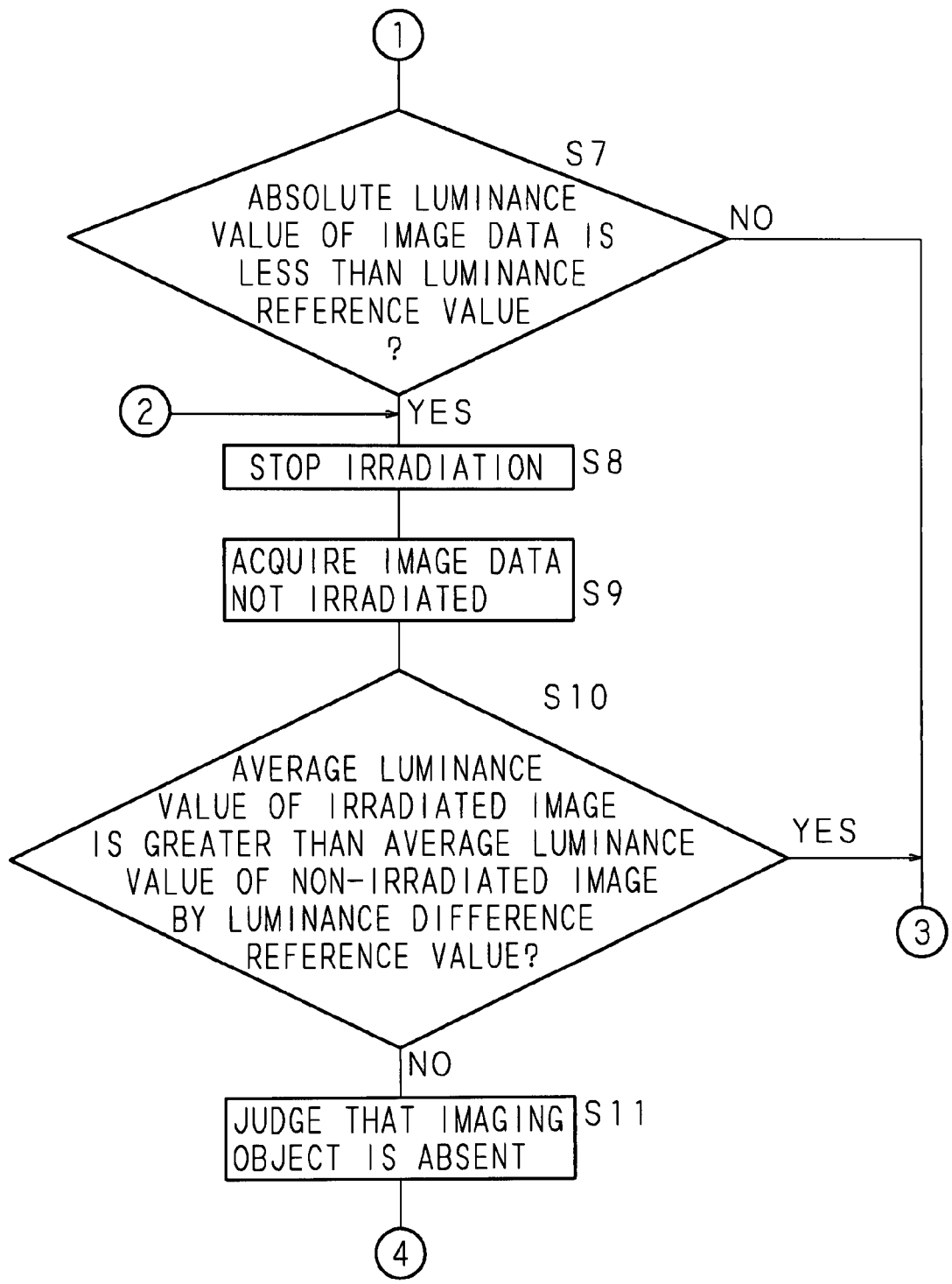

Next, the processing of various devices used in the image processing system of the present invention will be explained. FIG. 3 and FIG. 4 are flowcharts showing the processing of the image processing device 2 used in the image processing system of the present invention. By the control of the CPU 21 which executes the computer program 3 stored in the RAM 24, the image processing device 2 extracts, from the frame memory 25, the image data acquired by imaging of the imaging device 1 and accepted through the communication interface 26 (step S1), and performs a detection processing regarding the imaging object such as detecting the contour of the face and specifying the positions of the eyes and nostril of the driver, being the imaging object (step S2). The detection processing of steps S1 to S2 is performed by using each processing described in the aforementioned documents such as Japanese Patent Application Laid Open No. 2000-163564, Japanese Patent Application Laid Open No. 2004-234494, and Japanese Patent Application Laid-Open No. 2004-234367. In addition, various processing for supporting driving in accordance with, the result of the detection processing is executed. Further, the result of the detection processing at this time is recorded in the HD23 or RAM24.

By the control of the CPU 21, the image processing device 2 judges whether or not the imaging object can be detected by the processing of steps S1 to S2 (step S3), and when it is judged that the imaging object can be detected (step S3: YES), judges that the imaging object is present (step S4), and the processing returns to step S1 and the following processing are repeated for the next image data. The detection of step S3 is the detection of the presence/absence of the imaging object, and a judgment reference can be suitably set. For example, in the processing of steps S1 to S2, in the case where the contour of the face, eyes, and nostril of the driver, being the imaging object, are to be detected, it may be judged that the imaging object can be detected only when all of the contour, both eyes, and both nostrils are detected, or it may be judged that the imaging object can be detected when the contour, at least one of the eyes and at least one of the nostrils is detected. Note that as a state of detecting the imaging object used for judgment of step S3, the result of the detection processing of steps S1 to S2 recorded in the HD23 or RAM24 is read.

In step S3, when it is judged that the imaging object can not be detected (step S3: NO), by the control of the CPU 21, the image processing device 2 judges whether or not a state of being unable to detect the imaging object is successive by n-frames (n is a natural number) or more which is previously set as a first successive reference value (step S5). Note that the first successive reference value is recorded in the HD23 or RAM24.

In step S5, when the frames in a state of being unable to detect the imaging object are successive only by less than n-frames, being the first successive reference value (step S5: NO), by the control of the CPU21, the image processing device 2 judges whether or not the state of being unable to detect the imaging object is successive by m frames (m is the natural number and smaller than n) or more which is previously set as a second successive reference value smaller than the first successive reference value (step S6). Note that the second successive reference value is recorded in the HD23 or RAM24.

In step S6, when it is judged that the frames in a sate of being unable to detect the imaging object are successive only by less than m-frames, being the second successive reference value (step S6: NO), the processing is advanced to step S4, and by the control of the CPU21, the image processing device 2 judges that the imaging object is present (step S4). This is because when it is judged that the imaging object is absent under a successive state of being unable to detect the imaging object is short, possibility of the error recognition is high.

In step S6, when the frames in a state of being unable to detect the imaging object are successive by m-frames or more, being the second successive reference value (step S6: YES), by the control of the CPU21, the image processing device 2 judges whether or not an absolute luminance value of this image data is less than a previously set luminance reference value (step S7). Note that the luminance reference value is recorded in the HD23 or RAM24. The absolute luminance value is calculated as a product of an average luminance value, the shutter speed, the gain value and an irradiation width for example, based on the imaging condition data and irradiation condition data outputted from the imaging device 1 together with the image data, and the average luminance value of the pixels forming the image shown by the image data calculated by the image processing device 1. Concretely, the absolute luminance value is calculated by using expression (1) exemplified hereunder. Note that the imaging condition and the irradiation condition are not necessarily the values inputted from the imaging device 1 but may be the values outputted to the imaging device 1 as the data for control. In the imaging device 1 used in the image processing system of the present invention, an adjustment of gain value is performed so as to make constant the luminance of the face, being the imaging object. Accordingly, judgment using not a luminance value but an absolute luminance value is performed.

$$\text{Absolute luminance value} = \text{average luminance value} \times S/s \times \{1 + g/6\} \times s/t \quad (1)$$

where,
S: Criterion shutter speed constant number [sec](example: 1/250 sec)
s: Shutter speed [sec] (example: 1/2000 sec)
g: gain value (example: 0 to 5 Exemplified expression (1) is the case that 6 changes of 0 to 5 of the gain value corresponds to the change of the shutter speed 1/2)
t: Irradiation width [sec] (note that when t>s; t=s)

In step S7, when it is so judged that the absolute luminance value of the image data is equal to or more than the luminance reference value (step S7: NO), the processing is advanced to step S4 and by the control of the CPU 21, the image processing device 2 judges that the imaging object is present (step S4). In the image processing system of the present invention, since the imaging object is irradiated with light, the absolute luminance value becomes large in an object that present at a position closer to the imaging unit 11. Accordingly, when the absolute luminance value is equal to or more than the luminance reference value, it is so judged that the imaging object is present at the position closer to the imaging unit 11.

In step S5, when it is so judged that the frame in a state of being unable to detect the imaging object are successive by equal to or more than n-frames, being the first successive reference value (step S5: YES), or in step S7, when it is so judged that the absolute luminance value of the image data is less than the luminance reference value (step S7: YES), by the control of the CPU 21, the image processing device 2 stops the irradiation of the light by the irradiation unit 12 provided in the imaging device 1 (step S8), and acquires the image data imaged without light irradiation (step S9). The irradiation unit 12 irradiates light in the imaging direction, in a normal state that imaging is performed by the imaging unit 11. However, in step S8, by outputting, to the imaging device 1 from the image processing device 2, the data for controlling the irradiation of the irradiation units 12 to be stopped, the irradiation by the irradiation units 12 is temporarily stopped.

Then, the image processing device 2 compares the average luminance value of the image (irradiated image) imaged when light is irradiated and the average luminance of the image (non-irradiated image) imaged when no light is irradiated, and judges whether or not the average luminance value of the irradiated image is greater than the average luminance value of the non-irradiated image by a previously set luminance difference reference value (step S10). Note that the luminance difference reference value is recorded in the HD23 or RAM23.

In step S10, when it is so judged that the average luminance value of the irradiated image is greater than the average luminance value of the non-irradiated image by the luminance difference reference value (step S10: YES), the processing is advanced to step S4, and by the control of the CPU21, the image processing device 2 judges that the imaging object is present (step S4).

In step S10, when it is so judged that the difference between the average luminance value of the irradiated image and the average luminance value of the non-irradiated image is less than the luminance difference reference value (step S10: NO), by the control of the CPU21, the image processing device 2 judges that the imaging object is absent (step S11), and the processing is returned to step S1, and the following processing are repeated for the next image data. Then, various processing such as driving support processing and the like are executed when it is so judged that the imaging object is absent.

In the processing shown in steps S8 to S11, when light is irradiated, the average luminance value becomes large when the imaging object is present at a position closer to the imaging unit 11, on the contrary, the change of the average luminance value by the irradiation of light is small when the imaging object is absent. Accordingly, by comparing the average luminance value of the irradiated image and the average luminance value of the non-irradiated image, it becomes possible to judge the presence/absence of the imaging object. In addition, as the average luminance value used for the comparison of step S10, the average luminance value based on the luminance of an overall image data is not used, but preferably the image of the center portion excluding the image of the peripheral portion is extracted from the overall image shown by the image data, and the average luminance value regarding the image of the center portion is used. This is because when the imaging object is present, there is a high possibility that the imaging object is present in the center portion of the image, and therefore the difference between the case that the imaging object is present and the case that the imaging object is absent is large in the average luminance value of the center portion of the image, thus improving the judgment accuracy. Note that when there is a high possibility that the imaging object is present, i.e. when it is so judged that the imaging object can be detected in step S3, the processing such as comparing average luminance values shown in steps S8 to S11 and judging that the imaging object is absent and the like are avoided. This is because by stopping the irradiation of light, it is possible to prevent, for example, the generation of the error in the result of the processing shown in step S2 and the increase of the processing load.

As described above, according to this embodiment, the driver of the vehicle is defined as the imaging object. However, the present invention is not limited thereto, and can be modified to various modes, such that various human beings, and living matters or nonliving matters other than the human beings can be defined as the imaging object. For example, the present invention can be developed to various modes such as being applied to a monitor system for performing warning processing when it is so judged that no security officer is present, with the security officer who performs watching service at a constant position defined as the imaging object.

n addition, in the above-described embodiment, various processing is performed by the image processing device based on the image accepted from the imaging device. However, the present invention is not limited thereto, and can be modified to a mode such as performing all or a part of the processing described as the processing of the image processing device, by the imaging device.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. An image processing method of detecting a particular imaging object from images captured by an image processing device that includes an imaging part and an irradiating part, comprising:
    capturing and obtaining plural captured images by the imaging part;
    performing a detection process to determine whether the particular imaging object is included in the plural captured images;
    obtaining an irradiated image captured with irradiating light by the irradiating part in an imaging direction of the imaging part and an non-irradiated image captured without irradiating light by the irradiating part, when it is determined that the particular imaging object is not included in a predetermined number of captured images among the plural captured images;
    comparing, by the image processing device, the irradiated image and the non-irradiated image; and
    judging, by the image processing device, presence/absence of the particular imaging object in a region to be captured by the imaging part on the basis of a result of the comparing of the irradiated image and the non-irradiated image.

2. The image processing method as set forth in claim 1, further comprising acquiring each luminance of the images imaged by the imaging part,
    wherein the comparing includes comparing the luminance of the irradiated image with the luminance of the non-irradiated image, and
    wherein the judging includes judging that the imaging object is absent when the difference between the luminance of the irradiated image and the luminance of the non-irradiated image is less than a reference value.

3. The image processing method as set forth in claim 2, wherein the luminance is an average luminance of pixels constituting the image imaged by the imaging part.

4. The image processing method as set forth in claim 1, wherein the judging includes judging the presence/absence of the imaging object in the image imaged by the imaging part on the basis of an absolute luminance derived from an average luminance of pixels constituting the image imaged by the imaging part, an irradiation condition of the irradiating part, and an imaging condition of the imaging part.

5. The image processing method as set forth in claim 1, further comprising:
    judging possibility of detection of the particular imaging object from the image imaged by the imaging part,
    preventing the comparing and the judging from being performed when the particular imaging object is detected.

6. An image processing system including an imaging part, an irradiating part for irradiating light in a direction in which the imaging part captures images, and an image processing device for detecting a particular imaging object from an image captured by the imaging part, wherein
    the image processing device comprises:
        an obtaining part for obtaining plural images captured by the imaging part;
        a performing part for performing a detection process to determine whether the particular imaging object is included in the plural captured images;
        a part for obtaining an irradiated image captured with irradiating light by the irradiating part in an imaging direction of the imaging part and an non-irradiated image captured without irradiating light by the irradiating part, when it is determined that the particular imaging object is not included in a predetermined number of captured images among the plural captured images;
        a comparing part for comparing the irradiated image and the non-irradiated image; and
        a judging part for judging presence/absence of the particular imaging object in a region to be captured by the imaging part on the basis of a result of the comparison of the irradiated image with the non-irradiated image by the comparing part.

7. The image processing system as set forth in claim 6, wherein the image processing device further comprises a part for acquiring a luminance of the image imaged by the imaging part,
    wherein the comparing part compares the luminance of the irradiated image with the luminance of the non-irradiated image both imaged by the imaging part; and
    wherein the judging part judges that the imaging object is absent when the difference between the luminance of the irradiated image and the luminance of the non-irradiated image is less than a reference value.

8. The image processing system as set forth in claim 7, wherein each luminance is an average luminance of pixels constituting the image imaged by the imaging part.

9. The image processing system as set forth in claim 6, wherein the image processing device further comprises a judging part for judging the presence/absence of the imaging object in the image imaged by the imaging part on the basis of an absolute luminance derived from an average luminance of pixels constituting the image imaged by the imaging part, an irradiation condition of the irradiating part, and an imaging condition of the imaging part.

10. The image processing system as set forth in claim 6, wherein the image processing device further comprises a detection part for judging possibility of detection of the particular imaging object from the image imaged by the imaging part, and
    wherein both the comparing part and the judging part are prevented from being activated when the particular imaging object is detected.

11. An image processing device for detecting a particular imaging object from an image captured by an imaging part, comprising:
- an irradiating part which irradiates light in an imaging direction of the imaging part;
- an obtaining part which obtains plural images captured by the imaging part;
- a performing part which performs a detection process to determine whether the particular imaging object is included in the plural captured images;
- a part which obtains an irradiated image captured with irradiating light by the irradiating part in an imaging direction of the imaging part and an non-irradiated image captured without irradiating light by the irradiating part, when it is determined that the particular imaging object is not included in a predetermined number of captured images among the plural captured images;
- a comparing part which compares the irradiated image and the non-irradiated image; and
- a judging part which judges presence/absence of the particular imaging object in a region to be captured by the imaging part on the basis of a result of the comparison of the irradiated image with the non-irradiated image.

12. An image processing device as set forth in claim 11, further comprising an acquiring part which acquires a luminance of the image imaged by the imaging part,
- wherein the comparing part compares the luminance of the irradiated image with the luminance of the non-irradiated image imaged by the imaging part, and
- wherein the judging part judges that the imaging object is absent when the difference between the luminance of the irradiated image and the luminance of the non-irradiated image is less than a reference value.

13. The image processing device as set forth in claim 12, wherein each luminance is an average luminance of pixels constituting the image imaged by the imaging part.

14. The image processing device as set forth in claim 11, further comprising a judging part which judges the presence/absence of the imaging object in the image imaged by the imaging part on the basis of an absolute luminance derived from an average luminance of pixels constituting the image imaged by the imaging part, an irradiation condition of the irradiating part, and an imaging condition of the imaging part.

15. The image processing device as set forth in claim 11, further comprising a judging part which judges possibility of detection of the particular imaging object from the image imaged by the imaging part,
- wherein both the comparing part and the judging part are prevented from being activated when the particular imaging object is detected.

16. An image processing device which detects a particular imaging object from images captured by an imaging unit, comprising:
- an irradiation unit that irradiates light in an imaging direction of the imaging unit; and
- a controller that is connected to both the imaging unit and the irradiation unit and is capable of performing the following operations of:
  - obtaining plural images captured by the imaging unit;
  - performing a detection process to determine whether the particular imaging object is included in the plural captured images;
  - obtaining an irradiated image captured with irradiating light by the irradiation unit in an imaging direction of the imaging part and an non-irradiated image captured without irradiating light by the irradiation unit, when it is determined that the particular imaging object is not included in a predetermined number of captured images among the plural captured images;
  - comparing the irradiated image and the non-irradiated image; and
  - judging presence/absence of the particular imaging object in a region to be captured by the imaging unit on the basis of a result of the comparison of the irradiated image and the non-irradiated image.

17. A non-transitory computer readable medium encoded with a computer program that when executed causes a computer to perform a method that detects a particular imaging object from images captured by an imaging unit, the computer being available to be connected with the imaging unit and an irradiation unit which irradiates light in a direction in which the imaging unit captures images, said method comprising:
- obtaining plural images captured by the imaging unit;
- performing a detection process whether the particular imaging object is included in the plural captured images;
- obtaining an irradiated image captured with irradiating light by the irradiation unit in an imaging direction of the imaging part and an non-irradiated image captured without irradiating light by the irradiation unit, when it is determined that the particular imaging object is not included in a predetermined number of captured images among the plural captured images;
- comparing the irradiated image and the non-irradiated; and
- judging presence/absence of the particular imaging object in a region to be captured by the imaging unit on the basis of a result of the comparison between the irradiated image and the non-irradiated image.

18. The non-transitory computer readable medium as set forth in claim 17,
- further comprising acquiring a luminance of the image imaged by the imaging unit,
- wherein said comparing includes causing the computer to compare the luminance of the irradiated image with the luminance of the non-irradiated image imaged by the imaging unit, and
- wherein said judging includes causing the computer to judge that the imaging object is absent when the difference between the luminance of the irradiated image and the luminance of the non-irradiated image is less than a reference value.

* * * * *